US011433907B2

(12) United States Patent
Jeon et al.

(10) Patent No.: US 11,433,907 B2
(45) Date of Patent: Sep. 6, 2022

(54) APPARATUS FOR CONTROLLING PERSONALIZED DRIVING MODE BASED ON AUTHENTICATION OF DRIVER, SYSTEM INCLUDING THE SAME, AND METHOD THEREOF

(71) Applicants: Hyundai Motor Company, Seoul (KR); Kia Motors Corporation, Seoul (KR)

(72) Inventors: Byeong Wook Jeon, Seoul (KR); Dong Hoon Jeong, Hwaseong-si (KR); Jae Chang Kook, Hwaseong-si (KR); Kwang Hee Park, Suwon-si (KR)

(73) Assignees: Hyundai Motor Company, Seoul (KR); Kia Motor Corporation, Seoul (KR)

(*) Notice: Subject to any disclaimer, the term of this patent is extended or adjusted under 35 U.S.C. 154(b) by 350 days.

(21) Appl. No.: 16/862,709

(22) Filed: Apr. 30, 2020

(65) Prior Publication Data
US 2021/0171048 A1 Jun. 10, 2021

(30) Foreign Application Priority Data
Dec. 10, 2019 (KR) .................. 10-2019-0163997

(51) Int. Cl.
*B60W 40/09* (2012.01)
*B60W 60/00* (2020.01)
(Continued)

(52) U.S. Cl.
CPC ........ *B60W 40/09* (2013.01); *B60W 60/0059* (2020.02); *G06K 9/6267* (2013.01); *G06N 20/00* (2019.01); *H04W 4/80* (2018.02)

(58) Field of Classification Search
CPC ............ B60W 40/09; B60W 60/0059; B60W 2050/0095; B60W 2540/043;
(Continued)

(56) References Cited

U.S. PATENT DOCUMENTS

2014/0046528 A1* 2/2014 Santucci ................. B60L 58/12
701/99
2018/0274668 A1* 9/2018 Gray ................... F16H 61/0213
(Continued)

FOREIGN PATENT DOCUMENTS

| JP | 2010071299 A | 4/2010 |
| JP | 2018114913 A | 7/2018 |
| KR | 101500364 B1 | 3/2015 |

*Primary Examiner* — Omar Casillashernandez
(74) *Attorney, Agent, or Firm* — Slater Matsil, LLP (57) ABSTRACT

A personalized driving mode control device is provided. The device includes a controller configured to determine a driver based on identification information of the driver, a memory configured to store driving style information for the driver, and a personalized driving mode controller configured to control a drive mode for the driver depending on the driving style information for the driver, the drive mode configured to be controlled by receiving the driving style information of the driver from an external device when the driving style information is not stored in the memory, wherein the personalized driving mode controller is configured to correct the driving style information depending on a change in vehicle class and control the drive mode based on the corrected driving style information.

20 Claims, 8 Drawing Sheets

(51) Int. Cl.
*H04W 4/80* (2018.01)
*G06N 20/00* (2019.01)
*G06K 9/62* (2022.01)

(58) Field of Classification Search
CPC ......... B60W 2540/30; B60W 2556/55; B60W 30/182; B60W 50/08; B60W 10/20; B60W 40/076; B60W 2040/0809; B60W 2300/00; B60W 2540/10; B60W 2552/15; B60W 2556/45; G06K 9/6267; G06N 20/00; G06N 5/048; H04W 4/80; G06V 40/12; G06V 40/16; G06V 2201/08; B60R 25/04; B60R 25/252; B60R 2325/103
USPC .............................................................. 700/1
See application file for complete search history.

(56) References Cited

U.S. PATENT DOCUMENTS

| | | | |
|---|---|---|---|
| 2020/0216094 A1* | 7/2020 | Zhu .................... | G01C 21/3407 |
| 2021/0179068 A1* | 6/2021 | Park .................... | G01C 21/3691 |
| 2021/0179125 A1* | 6/2021 | Vardharajan ...... | B60W 50/0098 |

\* cited by examiner

APPARATUS FOR CONTROLLING PERSONALIZED DRIVING MODE BASED ON AUTHENTICATION OF DRIVER, SYSTEM INCLUDING THE SAME, AND METHOD THEREOF

CROSS-REFERENCE TO RELATED APPLICATIONS

This application claims priority to Korean Patent Application No. 10-2019-0163997, filed in the Korean Intellectual Property Office on Dec. 10, 2019, which application is hereby incorporated herein by reference.

TECHNICAL FIELD

The present disclosure relates to an apparatus for controlling a personalized driving mode based on authentication of a driver, a system including the same, and a method thereof.

BACKGROUND

In general, a system, which recognizes a driving style of a driver and automatically converts an engine and transmission control mode (hereinafter referred to as a "drive mode"), is designed to quantify driving manipulation situations, such as accelerator pedal manipulation and steering manipulation of the driver, in the form of a sporty index and operate a predetermined drive mode depending on a level of the index.

The drive mode is classified as an eco mode, a normal mode, or a sport mode. The drive mode is automatically converted into a corresponding drive mode according to a predetermined index criterion. For example, when the sporty index is low (smooth driving), the drive mode is converted into the eco mode. When the sporty index is average, the drive mode is converted into the normal mode. When the sporty index is high (aggressive driving), the drive mode is converted into the sport mode.

However, the sporty index is calculated during a very short time (usually within 0.1 to 0.2 seconds), but it generally takes a relatively long time of one hour or more while an average value of sporty indexes converges to represent driving habits of a driver. In the state where the sporty index converges, driving is performed in a drive mode optimally matched with a driving style of the driver.

However, when a driver is changed in the state where a sporty index converges on any one driver, because a vehicle behaves according to a driving style of the driver who drove the vehicle before, it takes a time until a sporty index converges on the changed driver and the second driver feels uncomfortable in sense of driving during the time. Because the driver is continuously changed, particularly, because the driver is frequently changed in shared vehicles, there is a need for a technology of recognizing each driver and automatically performing driver-customized personalized control.

SUMMARY

Embodiments of the present disclosure can solve above-mentioned problems occurring in the prior art while advantages achieved by the prior art are maintained intact.

The present disclosure relates to an apparatus for controlling a personalized driving mode based on authentication of a driver, a system including the same, and a method thereof.

Particular embodiments relate to technologies of storing driving characteristics for each driver and providing a driver customized driving mode.

An embodiment of the present disclosure provides an apparatus for controlling a personalized driving mode based on authentication of a driver to store a driving characteristic for each individual driver in a memory in the vehicle or an external device and provide a driver-customized personalized driving mode although the vehicle or the driver is changed, a system including the same, and a method thereof.

Another embodiment of the present disclosure provides an apparatus for controlling a personalized driving mode based on authentication of a driver to differentially apply a reflection ratio of a sporty index of a host vehicle according to a change in vehicle class when a driver uses a shared vehicle, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a personalized driving mode control device may include a controller that determines a driver based on identification information of the driver, a memory storing driving style information for each driver, and a personalized driving mode controller that controls a drive mode for each driver depending on the driving style information for each driver, the driving style information being stored in the memory and the drive mode being controlled by receiving the driving style information of the driver from an external device when the driving style information is not stored in the memory. The personalized driving mode controller may correct the driving style information depending on a change in vehicle class and may control the drive mode based on the corrected driving style information, when controlling the drive mode by receiving the driving style information of the driver from the external device.

In an embodiment, the personalized driving mode controller may correct the driving style information depending on a difference between a vehicle class of a host vehicle of the driver and a vehicle class of another vehicle in which the driver rides and may control the drive mode based on the corrected driving style information, when the driver rides in the other vehicle.

In an embodiment, the personalized driving mode controller may classify the vehicle class in an order of an economical vehicle, a family vehicle, a sports utility vehicle (SUV), a premium vehicle, and a sporty vehicle, which is an order where a sporty characteristic is strong. The personalized driving mode controller may determine a correction coefficient by applying the difference between the vehicle classes of the host vehicle and the other vehicle and may correct a sporty index of the driving style information using the correction coefficient.

In an embodiment, the personalized driving mode controller may multiply a sporty index of the driver, obtained when the host vehicle is traveling, by the correction coefficient according to the difference between the vehicle classes of the host vehicle and the other vehicle to calculate an initial sporty index of the other vehicle.

In an embodiment, the personalized driving mode controller may calculate an initial sporty index (SI) of the other vehicle using the equation: Initial SI of another vehicle=final SI of host vehicle*k (where SI is the sporty index and k is the correction coefficient).

The personalized driving mode controller may set the correction coefficient to 1 when the host vehicle and the other vehicle are in the same vehicle class as each other, may set the correction coefficient to a value greater than 1 when the other vehicle is more sporty in vehicle class than the host vehicle, and may set the correction coefficient to a value less than 1 when the other vehicle is less sporty in vehicle class than the host vehicle.

In an embodiment, the personalized driving mode controller may classify the vehicle class into at least one or more stages and may indicate a degree to which a sporty characteristic differs per stage as a relative distance.

In an embodiment, the personalized driving mode controller may correct the sporty index by adding a value calculated according to a vehicle class when the host vehicle is more sporty than the other vehicle with respect to the correction coefficient of 1 and subtracting a value calculated according to a vehicle class when the host vehicle is less sporty than the other vehicle with respect to the correction coefficient of 1.

In an embodiment, the controller may identify the driver using authentication results of at least one of starting authentication using fingerprint information of the driver, starting authentication using face information of the driver, or starting authentication through near field communication (NFC).

In an embodiment, the personalized driving mode control device may further include a driver style calculation device that calculates the driving style information by applying at least one or more of an amount of manipulation of an accelerator pedal, a manipulation speed of the accelerator pedal, an amount of manipulation of a steering wheel, or a gradient of a road to a learning algorithm.

In an embodiment, the personalized driving mode controller may receive driving style information of a driver ID from an external server or a user terminal of the driver and may control the drive mode based on the received driving style information, when the other vehicle is a shared vehicle.

In an embodiment, the personalized driving mode control device may further include a communication device that transmits and receives the driving style information with the external device.

In an embodiment, the personalized driving mode controller may calculate and update driving style information per a predetermined time while a vehicle is traveling, may store final driving style information in the memory when an ignition is turned off, and may transmit the final driving style information to the external device via the communication device.

In an embodiment, the personalized driving mode controller may determine the driver as an unregistered driver, when driving style information of the determined driver is not stored in the memory and the external device, may execute a learning algorithm during a predetermined time to obtain driving style information, and may control a drive mode suitable for the obtained driving style information.

According to another embodiment of the present disclosure, a vehicle system may include an external device that transmits and receives and stores driving style information for each driver and a personalized driving mode control device that controls a drive mode for each driver depending on driving style information for each driver, the driving style information being stored in a memory and the drive mode being controlled by receiving driving style information of a corresponding driver from an external device when the driving style information is not stored in the memory. The personalized driving mode control device may correct the driving style information depending on a change in vehicle class and controls the drive mode based on the corrected driving style information, when controlling the drive mode by receiving the driving style information of the driver from the external device.

In an embodiment, the external device may include a server or a user terminal.

In an embodiment, the vehicle system may further include a driver authentication starting device that performs at least one of starting authentication using fingerprint information of the driver, starting authentication using face information of the driver, or starting authentication through NFC and may provide the authenticated result to the personalized driving mode control device.

According to another embodiment of the present disclosure, a personalized driving mode control method may include determining whether driving style information corresponding to driver identification information is stored in a vehicle, based on the driver identification information, and controlling a drive mode for each driver depending on the driving style information stored in the vehicle, the drive mode being controlled by receiving driving style information of a corresponding driver from an external device when the driving style information is not stored in the vehicle. The controlling of the drive mode may include correcting the driving style information depending on a change in vehicle class and controlling the drive mode based on the corrected driving style information, when controlling the drive mode by receiving the driving style information of the driver from the external device.

In an embodiment, the controlling of the drive mode may include correcting the driving style information depending on a difference between a vehicle class of a host vehicle of the driver and a vehicle class of another vehicle in which the driver rides and controlling the drive mode based on the corrected driving style information, when the driver rides in the other vehicle.

In an embodiment, the correcting of the driving style information and the controlling of the drive mode may include classifying the vehicle class in an order of an economical vehicle, a family vehicle, an SUV, a premium vehicle, and a sporty vehicle, which is an order where a sporty characteristic is strong and determining a correction coefficient by applying the difference between the vehicle classes of the host vehicle and the other vehicle and correcting a sporty index of the driving style information using the correction coefficient.

In an embodiment, the correcting of the driving style information and the controlling of the drive mode may include calculating an initial sporty index (SI) of the other vehicle using the equation: Initial SI of another vehicle=final SI of host vehicle*k (where SI is the sporty index and k is the correction coefficient), and setting the correction coefficient to 1 when the host vehicle and the other vehicle are in the same vehicle class as each other, setting the correction coefficient to a value greater than 1 when the other vehicle is more sporty in vehicle class than the host vehicle, and setting the correction coefficient to a value less than 1 when the other vehicle is less sporty in vehicle class than the host vehicle.

BRIEF DESCRIPTION OF THE DRAWINGS

The above and other objects, features and advantages of the present disclosure will be more apparent from the following detailed description taken in conjunction with the accompanying drawings, in which:

FIG. 4, which includes

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An embodiment of the present disclosure may disclose a configuration of storing a driving characteristic (a sporty index) for each individual driver in a memory in a vehicle or a server or a user terminal outside the vehicle and providing a driver-customized driving mode although the vehicle or a driver is changed. Furthermore, an embodiment of the present disclosure may disclose a configuration of differentially applying a sporty index depending on a vehicle class in a shared vehicle.

Hereinafter, a description will be given in detail of embodiments of the present disclosure with reference to FIGS. 1 to 8.

Figure 1:
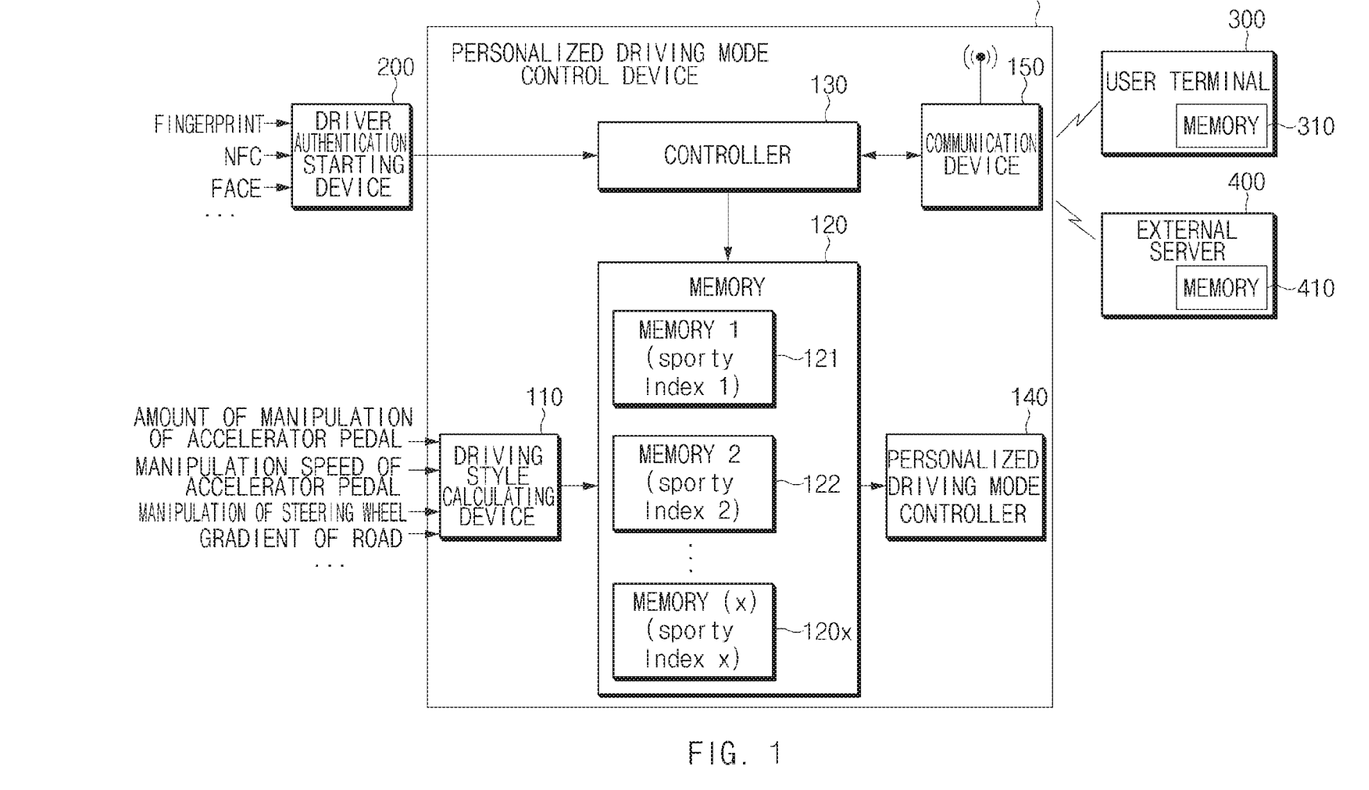
FIG. 1 is a block diagram illustrating a configuration of a vehicle system including a personalized driving mode control device according to an embodiment of the present disclosure.
Figure 2:
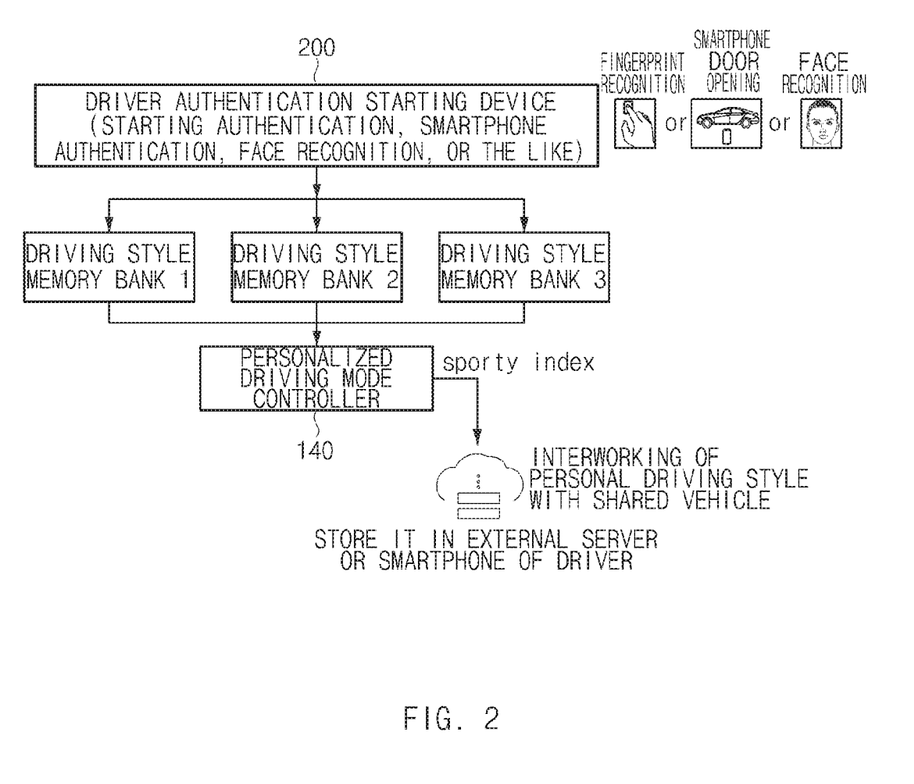
FIG. 2 is a drawing illustrating a configuration associated with a driving authentication starting device according to an embodiment of the present disclosure.
Figure 3:
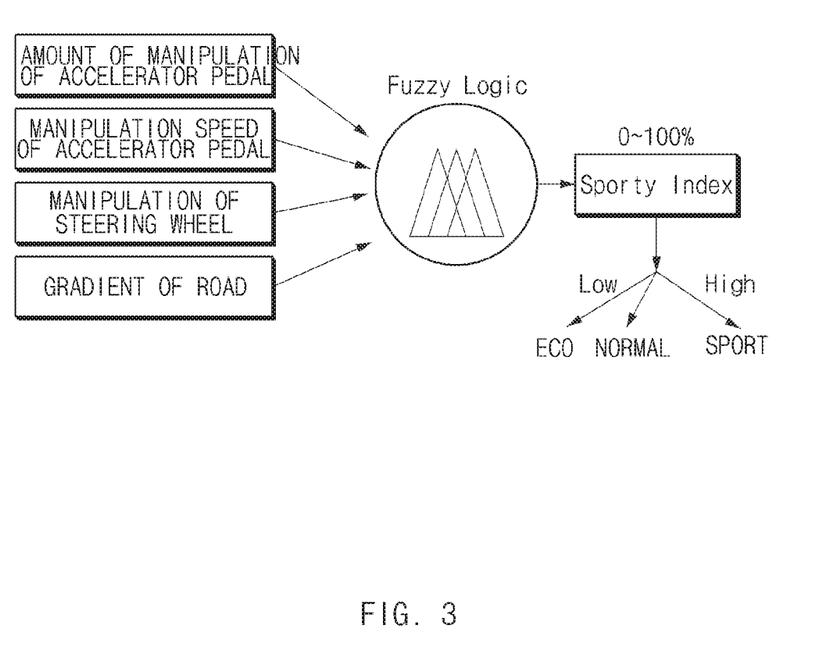
FIG. 3 is a drawing illustrating a process of determining a drive mode according to a driving style according to an embodiment of the present disclosure.

FIG. 1 is a block diagram illustrating a configuration of a vehicle system including a personalized driving mode control device according to an embodiment of the present disclosure. FIG. 2 is a drawing illustrating a configuration associated with a driving authentication starting device according to an embodiment of the present disclosure. FIG. 3 is a drawing illustrating a process of determining a drive mode according to a driving style according to an embodiment of the present disclosure.

A personalized driving mode control device 100 according to an embodiment of the present disclosure may be implemented in a vehicle. In this case, the personalized driving mode control device 100 may be integrally formed with control units in the vehicle, or may be implemented as a separate device to be connected with the control units of the vehicle by a separate connection means.

Referring to FIG. 1, the vehicle system according to an embodiment of the present disclosure may include a personalized driving mode control device 100 and a driver authentication starting device 200. The system may further include a user terminal 300 or an external server 400, which may transmit, receive and store driving style information through wireless communication with the personalized driving mode control device 100. In this case, the user terminal 300 may be present outside or inside the vehicle.

The driver authentication starting device 200 may be a personalized starting device of the vehicle, which may perform fingerprint starting, smartphone near field communication (NFC) starting, face recognition starting, or the like and may provide the result of performing authentication to the personalized driving mode control device 100. As shown in FIG. 2, the driver authentication starting device 200 may perform authentication of a driver through fingerprint recognition, an operation of opening a door using the smartphone, face recognition, or the like.

The personalized driving mode control device 100 may control a drive mode for each driver depending on driving style information for each driver, stored in a memory 120. When driving style information is not stored in the memory 120, the personalized driving mode control device 100 may receive driving style information of a corresponding driver from an external device (e.g., the external server 400 or the user terminal 300) and may control the drive mode based on the received driving style information. Furthermore, when receiving the driving style information of the driver from the external device and controlling the drive mode based on the received driving style information, the personalized driving mode control device 100 may correct the driving style information depending on a change in vehicle class and may control the drive mode based on the corrected driving style information. In this case, the driving style information may include a sporty index.

The personalized driving mode control device 100 may include a driving style calculating device 110, the memory 120, a controller 130, a personalized driving mode controller 140, and a communication device 150.

The driving style calculating device 110, the controller 130, and the personalized driving mode controller 140 may be implemented as one processor and may be, for example, one transmission control unit (TCU), an electronic control unit (ECU), a micro controller unit (MCU), or another sub-controller, which is loaded into the vehicle.

The driving style calculating device 110, the controller 130, and the personalized driving mode controller 140 may be electrically connected with each other, may process a signal delivered between respective components, and may electrically control the respective components. The driving style calculating device 110, the controller 130, and the personalized driving mode controller 140 may be electrical circuits which execute instructions of software and may perform a variety of data processing and calculation described below.

The driving style calculating device 110 may apply at least one of the amount of manipulation of an accelerator pedal, a manipulation speed of the accelerator pedal, the amount of manipulation of a steering wheel, or a gradient of the road to a learning algorithm to calculate driving style information. As shown in FIG. 3, the driving style calculating device 110 may accumulate and calculate a sporty index through a fuzzy logic or the like and may determine a drive mode using the calculated sporty index.

When the sporty index of the driver is less than a first sporty index, the driving style calculating device 110 may determine a driving style of the driver as an eco mode. When the sporty index of the driver is greater than or equal to the first sporty index, the driving style calculating device 110 may determine the driving style as a normal mode. When the sporty index of the driver is greater than or equal to a second sporty index greater than the first sporty index, the driving style calculating device 110 may determine the driving style as a sport mode. In this case, the eco mode may be a drive mode where a rate of fuel consumption is minimized, the normal mode may be a drive mode where a rate of fuel consumption is normal, and the sport mode may be a drive mode where a rate of fuel consumption is high, which is a sporty drive mode.

The controller 130 may control operations of the memory 120 and the communication device 150 to control transmission and reception of a signal. The controller 130 may identify the driver using authentication results of at least one of starting authentication using fingerprint information of the driver, starting authentication using face information of the driver, or starting authentication through NFC. In this case, the controller 130 may identify a driver ID and may determine whether a sporty index of the driver ID is stored in the memory 120.

The memory 120 may store a sporty index (driving style information) for each driver (each driver ID) for each memory bank 121, 122, . . . , or 120x and may store data and/or algorithms necessary for operations of the driving style calculating device 110, the controller 130, and the personalized driving mode controller 140.

As an example, as shown in FIG. 2, the memory 120 may be divided into a plurality of memory banks and may store a sporty index for each driver ID per memory bank.

The memory 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

When another vehicle is a shared vehicle, the personalized driving mode controller 140 may receive driving style information of a driver ID from the external server 400 or the user terminal 300 of the driver and may control a drive mode based on the received driving style information.

When the driver rides in another vehicle (e.g., a shared vehicle), the personalized driving mode controller 140 may correct driving style information depending on a difference between a vehicle class of a host vehicle of the driver and a vehicle class of the other vehicle in which the driver rides and may control a drive mode based on the corrected driving style information. In this case, the vehicle class may be to divide a vehicle model depending on a sporty level. The personalized driving mode controller 140 may classify the vehicle class in an order of an economical vehicle, a family vehicle, a sports utility vehicle (SUV), a premium vehicle, and a sporty vehicle, which is an order where a sporty characteristic is strong.

The personalized driving mode controller 140 may determine a correction coefficient by applying a difference between vehicle classes of the host vehicle and another vehicle and may correct a sporty index of the driving style information using the correction coefficient.

The personalized driving mode controller 140 may classify the vehicle class into at least one stage and may indicate a degree to which a sporty characteristic differs per stage as a relative distance.

The personalized driving mode controller 140 may correct a sporty index by adding a predetermined distance value according to the vehicle class (a value calculated according to the vehicle class) when the host vehicle is more sporty than a shared vehicle with respect to the correction coefficient of 1 and subtracting the predetermined distance value according to the vehicle class (the value calculated according to the vehicle class) when the host vehicle is less sporty than the shared vehicle with respect to the correction coefficient of 1.

The personalized driving mode controller 140 may multiply a sporty index of the driver, obtained when the host vehicle is traveling, by a correction coefficient according to a difference between vehicle classes of the host vehicle and another vehicle like Equation 1 below to calculate an initial sporty index of the other vehicle (shared vehicle).

$$\text{Initial SI of shard vehicle} = \text{final SI of host vehicle} * k \quad \text{[Equation 1]}$$

Herein, SI denotes the sporty index, and k denotes the correction coefficient. In this case, the shared vehicle may include another vehicle except for the host vehicle.

When the host vehicle and another vehicle are in the same vehicle class as each other, the personalized driving mode controller 140 may set the correction coefficient to 1. When the other vehicle is more sporty in vehicle class than the host vehicle, the personalized driving mode controller 140 may set the correction coefficient to a value greater than 1. When the other vehicle is less sporty in vehicle class than the host vehicle, the personalized driving mode controller 140 may set the correction coefficient to a value less than 1.

The personalized driving mode controller 140 may calculate and update driving style information using a learning algorithm per predetermined time while the vehicle is traveling. When the ignition is turned off, the personalized driving mode controller 140 may store final driving style information in the memory 120 in the vehicle and may transmit the final driving style information to the external server 400 or the user terminal 300 via the communication device 150. Thus, the external server 400 or the user terminal 300 may match the received final driving style information to a driver ID and may store the matched information.

When the determined driving style information of the driver is not stored in all of the memory 120, the external server 400, and the user terminal 300, the personalized driving mode controller 140 may determine the driver as an unregistered driver and may execute the learning algorithm during a predetermined time. When the driving style information is obtained, the personalized driving mode controller 140 may control a drive mode suitable for the obtained driving style information.

The communication device 150 may be a hardware device implemented with various electronic circuits to transmit and receive a signal through a wireless or wired connection. In an embodiment of the present disclosure, the communication device 150 may perform network communication technology in the vehicle and may perform vehicle-to-infrastructure (V2I) communication with a server, an infrastructure, or another vehicle outside the vehicle using wireless internet technology or short range communication. Herein, the network communication technology in the vehicle may be to perform inter-vehicle communication through controller area network (CAN) communication, local interconnect network (LIN) communication, flex-ray communication, or the like. Furthermore, the wireless internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

As an example, the communication device 150 may transmit and receive driving style information for each driver with the external server 400 and the user terminal 300.

As such, the present technology may individually recognize a driver in conjunction with the personalized authentication starting device of the vehicle (e.g., fingerprint starting, smartphone NFC starting, face recognition starting, or the like), may separately store a sporty index for each individual driver in a memory in a TCU, and may separately store a sporty index accumulated for a long time per driver.

After the driving is completed, when the ignition is turned off, the present technology may store a sporty index result in the memory of the TCU in the vehicle and the external server or the user terminal. Thereafter, when the ignition is turned on again, the present technology may fetch driving style information of the driver and may provide a drive mode suitable for the driver.

Particularly, because a driver ID of the driver and a sporty index are stored together in the external server or the user terminal, when the driver drives a shared vehicle, the present technology may automatically control a drive mode in response to a driving style corresponding to the driver to facilitate driver-customized driving although the vehicle or the driver is changed.

Furthermore, when a vehicle model of a shared vehicle is different from a vehicle model of the host vehicle, the present technology may correct and apply a sporty index of the driver depending on the vehicle model or a vehicle class to increase satisfaction of the driver. For example, when a driver who uses a small economical vehicle with a high rate of fuel consumption selects a sporty vehicle as a shared vehicle, the present technology may increase a sporty index to provide a drive mode, thus increasing satisfaction of the driver.

Figure 4A:
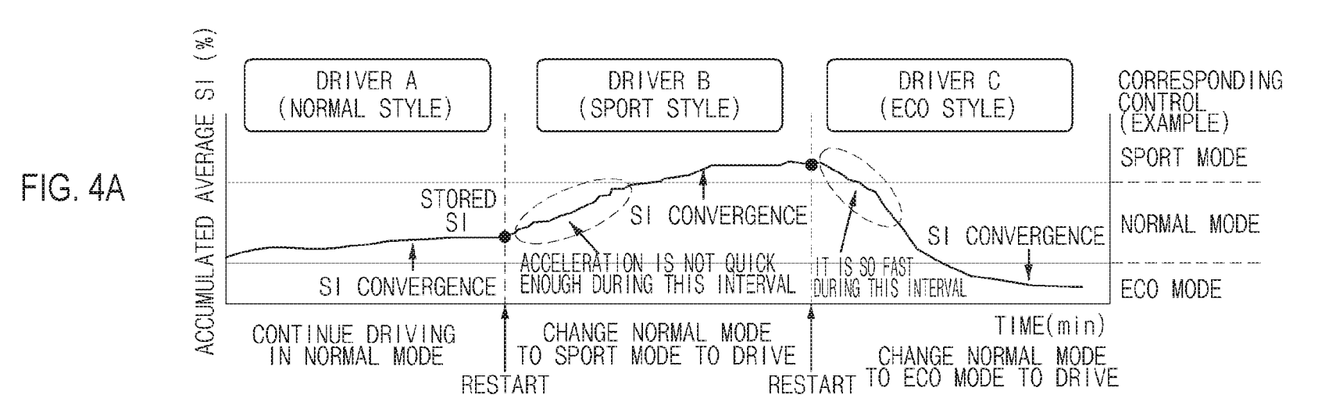
FIGS. 4A and 4B, is a drawing illustrating a process of comparing a new sporty index with an old sporty index when drivers with different driving styles are changed and representing a change in sporty index, according to an embodiment of the present disclosure.
Figure 4B:
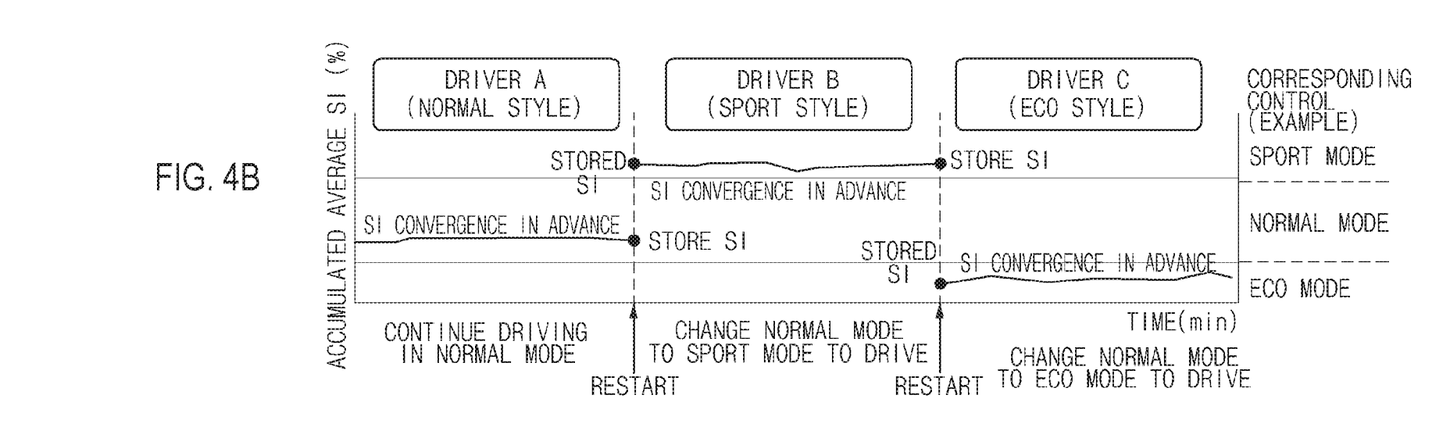

FIG. 4, which includes FIGS. 4A and 4B, is a drawing illustrating a process of comparing a next sporty index with an old sporty index when drivers with different driving styles are changed and representing a change in sporty index, according to an embodiment of the present disclosure.

Referring to FIG. 4A, when driving of old driver A who has a normal style (a mild style) is completed, a sporty index of the normal style may be stored. Thereafter, when driver B who has a strong sport style (aggressive style) rides in a corresponding vehicle, a drive mode may be controlled in a normal mode according to the previously stored sporty index of driver A at the beginning of driving. Thus, driver B of the sport style may feel stuffy at the beginning of driving in the normal mode, but the sporty index may then increase to a point corresponding to a sport mode through a learning algorithm.

Thereafter, when driver C who has an eco style (a super mild style) opposite to the sport style rides in the vehicle, a drive mode may be controlled in a sport mode according to the previously stored sporty index of driver B at the beginning of driving, such that driver C of the eco style greatly feels a sense of difference until the sport mode changes to an eco mode.

Thus, as shown in FIG. 4B, an embodiment of the present disclosure may download the stored sporty index of driver B from an external server or a user terminal and may apply the downloaded sporty index to determination of a drive mode as soon as driver A changes to driver B, thus minimizing the sense of difference. Similarly, an embodiment of the present disclosure may apply the sporty index of driver C to determine a drive mode as soon as driver B changes to driver C, thus minimizing the sense of difference.

Figure 5:
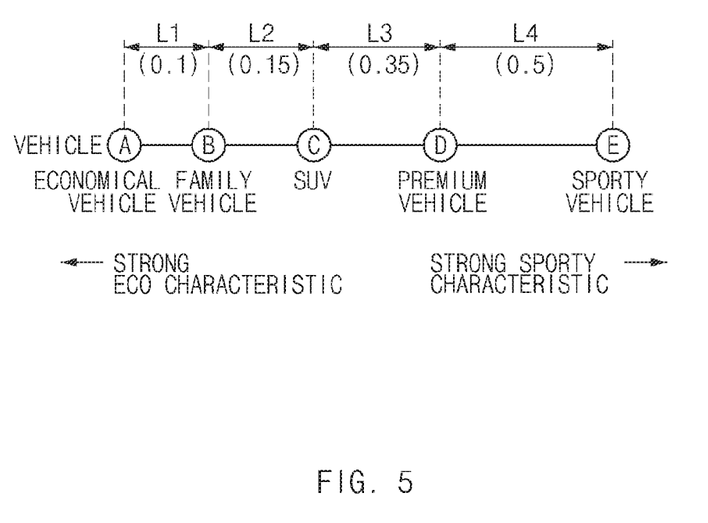
FIG. 5 is a drawing illustrating a correction coefficient for differentially applying a sporty index depending on a vehicle class, according to an embodiment of the present disclosure.
Figure 6:
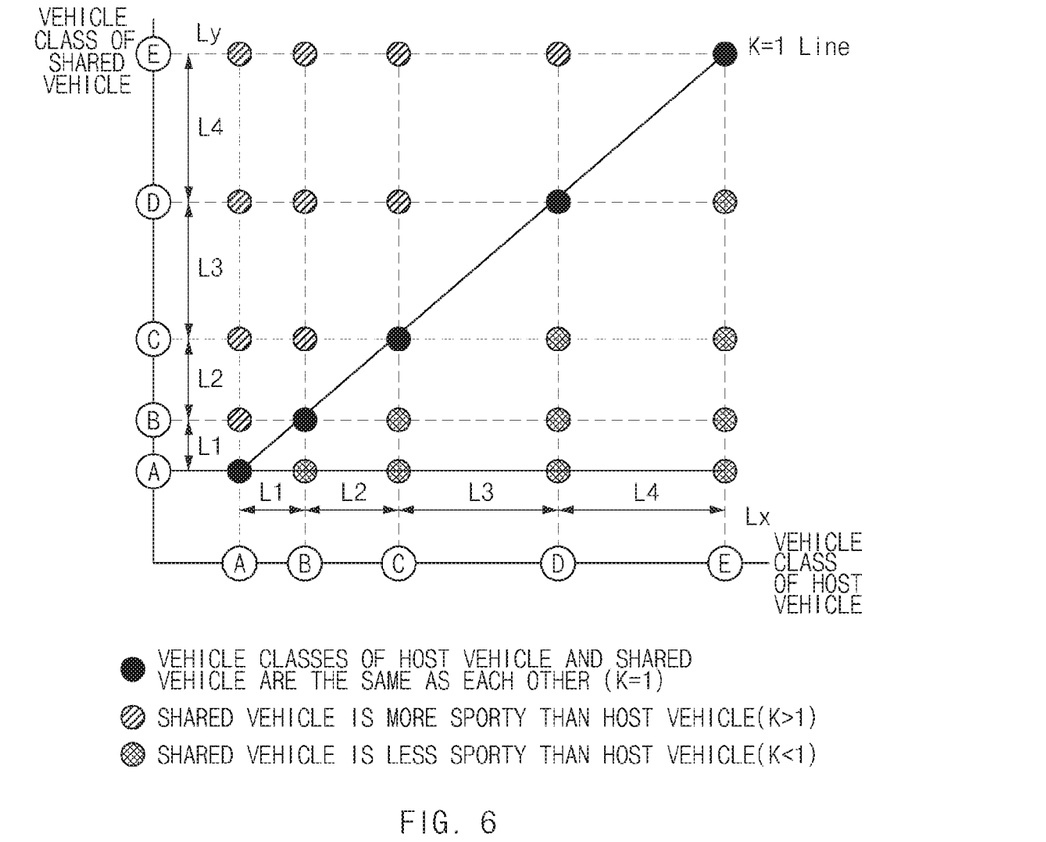
FIG. 6 is a drawing illustrating a change in correction coefficient for differentially applying a sporty index depending on a difference between a vehicle class of a shared vehicle and a vehicle class of a host vehicle, according to an embodiment of the present disclosure.

FIG. 5 is a drawing illustrating a correction coefficient for differentially applying a sporty index depending on a vehicle class, according to an embodiment of the present disclosure. FIG. 6 is a drawing illustrating a change in correction coefficient for differentially applying a sporty index depending on a difference between a vehicle class of a shared vehicle and a vehicle class of a host vehicle, according to an embodiment of the present disclosure.

When a driver rides in another vehicle (e.g., a shared vehicle), a personalized driving mode control device 100 of FIG. 1 may correct driving style information depending on a difference between a vehicle class of a host vehicle of the driver and a vehicle class of the other vehicle in which the driver rides and may control a drive mode based on the corrected driving style information. Referring to FIG. 5, the vehicle class may be to divide a vehicle model depending on a sporty level. The personalized driving mode control device 100 may classify the vehicle class in an order of an economical vehicle, a family vehicle, an SUV, a premium vehicle, and a sporty vehicle, which is an order where a sporty characteristic is strong. In FIG. 5, the vehicle class is classified into five stages according to the sporty characteristic, but the present disclosure is not limited thereto. For example, the vehicle class may be classified into various vehicle classes if necessary.

As such, the personalized driving mode control device 100 may classify the vehicle class into 5 stages ranging from an eco to a sporty level and may represent a degree to which characteristics differ from each other as a relative distance.

Referring to FIG. 6, when a host vehicle and a shared vehicle are in the same vehicle class as each other, the personalized driving mode control device 100 may set a correction coefficient as K=1. When the shared vehicle is more sporty in vehicle class than the host vehicle, the personalized driving mode control device 100 may set the correction coefficient as K>1. When the shared vehicle is less sporty in vehicle class than the host vehicle, the personalized driving mode control device 100 may set the correction coefficient as K<1.

The personalized driving mode control device 100 may determine a sporty index by adding distance Ly when the host vehicle is more sporty than the shared vehicle with respect to the K=1 line in FIG. 6 and subtracting distance Ly when the host vehicle is less sporty than the shared vehicle with respect to the K=1 line. Table 1 below is a table summarizing these features.

TABLE 1

(1) When the relationship between the host vehicle and the shared vehicle is located on the K = 1 line (when the host vehicle and the shared vehicle are in the same vehicle class as each other): k = 1
(2) When the relationship between the host vehicle and the shared vehicle is located over the K = 1 line (when the shared vehicle is more sporty in vehicle class than the host vehicle): k = 1 + Σ Ly
(3) When the relationship between the host vehicle and the shared vehicle is located under the K = 1 line (when the shared vehicle is less sporty in vehicle class than the host vehicle): k = 1 - Σ Ly As such, when the shared vehicle is more sporty than the host vehicle, the personalized driving mode control device 100 may provide a value greater than a sporty index learned in the host vehicle from the beginning of starting as an initial value such that it is possible to perform sporty driving from the beginning of the driving of the shared vehicle. On the other hand, it is possible to perform economical driving from the beginning of driving.

The present technology may individually recognize a driver in conjunction with the personalized authentication starting device of the vehicle (e.g., fingerprint starting, smartphone NFC starting, face recognition starting, or the like), may include a memory capable of separately storing a sporty index for each individual driver in a TCU to separately store a sporty index accumulated for a long time per driver. When the ignition is turned off, the present technology may store the result in the TCU in the vehicle and a central server. Thereafter, when the ignition is turned on again, the present technology may fetch data of the driver and may provide the sense of driving suitable for the driver. Particularly, because a personal ID of the driver and the sporty index are stored together in the central server, when the driver drives a shared vehicle, the present technology may automatically control a drive mode in response to a driving style corresponding to the driver to facilitate driver-customized driving in any case between persons and between vehicles.

Figure 7:
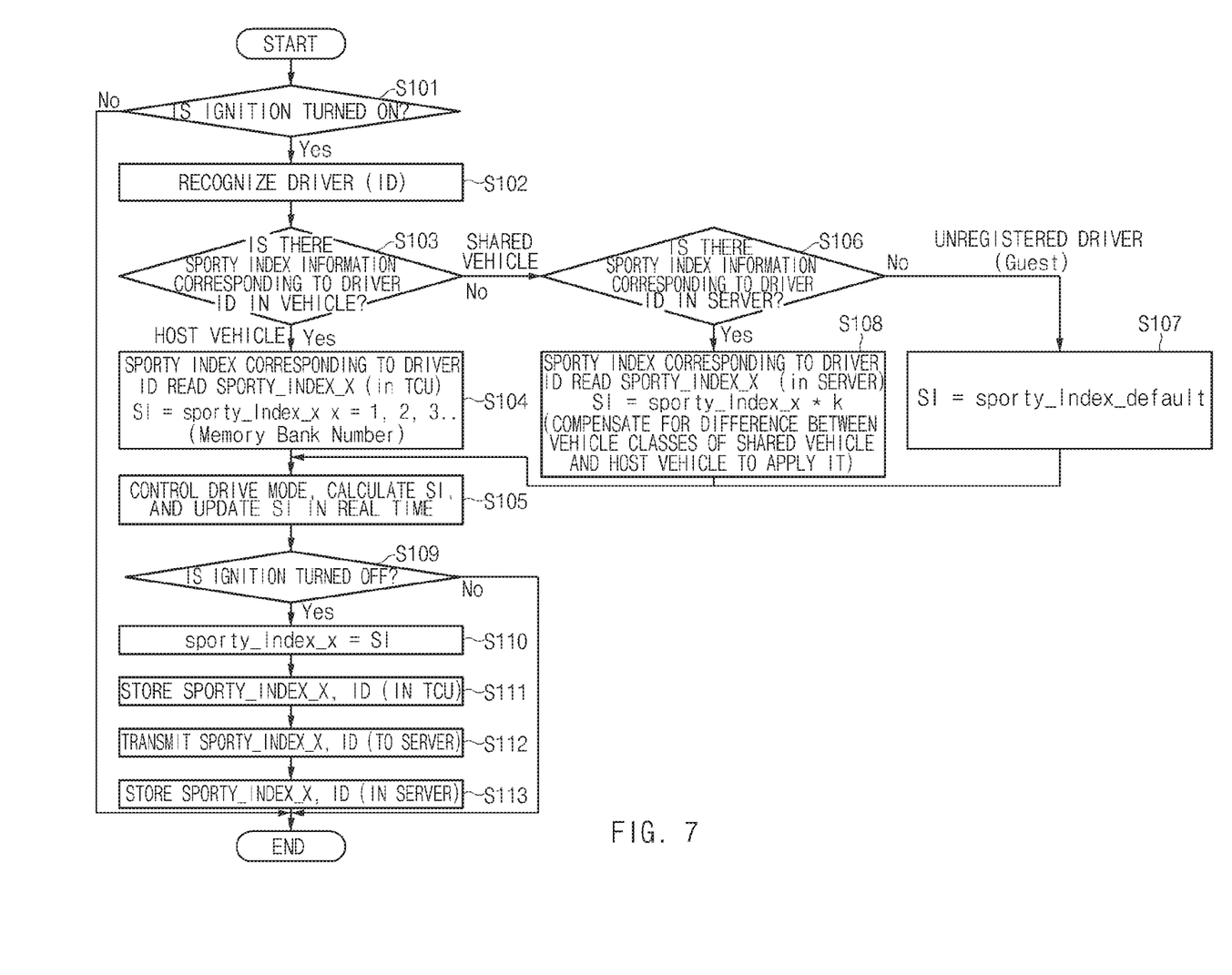
FIG. 7 is a flowchart illustrating a personalized driving mode control method according to another embodiment of the present disclosure.

Hereinafter, a description will be given in detail of a personalized driving mode control method according to an embodiment of the present disclosure. FIG. 7 is a flowchart illustrating a personalized driving mode control method according to another embodiment of the present disclosure.

It is assumed that a personalized driving mode control device 100 of FIG. 1 performs a process of FIG. 7. Furthermore, in a description of FIG. 7, an operation described as being performed by an apparatus may be understood as being controlled by a personalized driving mode controller 140 of the personalized driving mode control device 100. In this case, a personalized driving mode control technology according to an embodiment of the present disclosure may be provided to a driver previously registered with a personalized driving mode control service. Because the process of registration with the personalized driving mode control service is a common process, a detailed description thereof will be omitted. Hereinafter, in FIG. 7, the description assumes that a driver is registered with the personalized driving mode control service.

Referring to FIG. 7, when the ignition of a vehicle is turned on in S101, in S102, the apparatus may recognize the driver to obtain a driver ID. In this case, the apparatus may recognize the driver using fingerprint information of the driver, face recognition information of the driver, and information (driver ID information) received through near field communication (NFC) from a user terminal of the driver and may identify an ID. Thus, a memory 120 in the vehicle may store a driver ID mapped to fingerprint information, face recognition information, or the like, which is previously registered for driver recognition.

In S103, the apparatus may determine whether there is sporty index information (driving style information) of a driver ID, corresponding to the driver ID information received through the NFC in S102 and the fingerprint information and the face recognition information of the driver, obtained through the driver recognition, in the memory 120 in the vehicle.

When there is the sporty index information of the identified driver ID in the memory 120 in the vehicle, in S104, the apparatus may determine that the driver drives a host vehicle and may read a sporty index (sporty_Index_x) corresponding to the identified driver ID. In S105, the apparatus may perform driving control in a drive mode corresponding to the read sporty index. In this case, the drive mode may be classified as an eco mode, a normal mode, or a sport node. The eco mode may be a drive mode at a low rate of fuel consumption. The normal mode may be a drive mode of a driver who has a general mild style. The sport mode may be a drive mode of a driver who has an aggressive style. When the sporty index of the driver is less than a first sporty index, the apparatus may perform driving control in the eco mode. When the sporty index of the driver is greater than or equal to the first sporty index, the apparatus may perform driving control in the normal mode. When the sporty index of the driver is greater than or equal to the second sporty index greater than the first sporty index, the apparatus may perform driving control in the sport mode.

When the sporty index information of the driver ID is not stored in the memory 120 in the vehicle in S103, in S106, the apparatus may determine that the driver drives a shared vehicle and may determine whether there is the sporty index information of the driver ID in a memory 410 in a server 400.

When the sporty index information of the driver ID is not stored in the memory 410 in the server 400, because the sporty index information of the driver ID is not stored in both the vehicle and the server 400, the apparatus may determine that the driver is a driver (SI=sporty_Index_default) who is not registered with the personalized driving mode control service in S107. As shown in FIG. 3, the apparatus may identify a drive mode of the driver during a certain time and may determine a sporty index.

Meanwhile, when the sporty index information of the driver ID is stored in the memory 410 in the server 400, in S108, the apparatus may receive the sporty index information of the driver ID from the server 400. In this case, for the shared vehicle, a sporty index may differ due to a difference between vehicle classes of the host vehicle and the shared vehicle. In other words, a sporty index may differ due to a difference between a vehicle class when the driver drives the host vehicle and a vehicle class when the driver drives the shared vehicle (another vehicle). As shown in FIG. 5, when the host vehicle is a small car and when the shared vehicle is an SUV, a sporty index may be differently reflected. Thus, as shown in FIG. 6, the apparatus may apply a correction coefficient according to a difference between vehicle classes of the host vehicle and the shared vehicle to correct a sporty index.

In S105, the apparatus may reflect a drive mode depending on the corrected sporty index of the driver ID to control the drive mode, may accumulate a sporty index during a certain time, and may update the sporty index.

In S109, the apparatus may change or maintain a drive mode depending on the updated sporty index while driving and may check whether the ignition is turned off.

When the ignition is turned off, in S110, the apparatus may determine a final sporty index (sporty_Index_x=SI). In S111, the apparatus may store the final sporty index in the memory 120 in the vehicle. In S112, the apparatus may transmit the final sporty index to the server 400. In S113, the apparatus may store the final sporty index in the server 400.

As such, an embodiment of the present disclosure may learn a driving characteristic for each individual driver, may store a sporty index corresponding to the learned driving characteristic for each individual driver in the memory in the vehicle or the server or the user terminal outside the vehicle for each driver ID, and may immediately provide a driver-customized driving mode although the vehicle or the driver is changed, thus increasing satisfaction of the driver. Furthermore, when the driver is changed in the shared vehicle, an embodiment of the present disclosure may differentially apply a sporty index according to a difference between vehicle classes of the host vehicle and the shared vehicle per driver, thus increasing satisfaction of the drivers.

Figure 8:
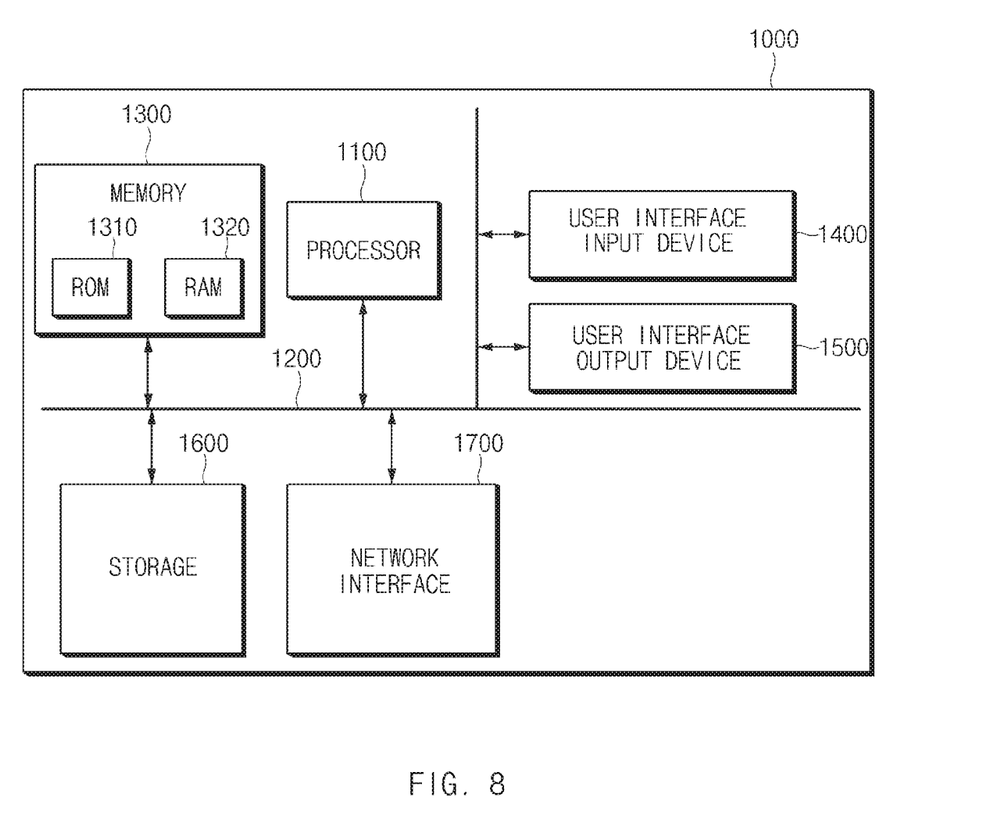
FIG. 8 is a block diagram illustrating a computing system according to an embodiment of the present disclosure.

FIG. 8 is a block diagram illustrating a computing system according to an embodiment of the present disclosure.

Referring to FIG. 8, a computing system 100 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Embodiments of the present disclosure may store a driving characteristic for each individual driver in a memory in the vehicle or an external device and may provide a driver-customized personalized driving mode although the vehicle or the driver is changed, thus increasing convenience of the driver.

Furthermore, an embodiment of the present disclosure may differentially apply a reflection ratio of a sporty index of a host vehicle according to a change in vehicle class when the driver uses a shared vehicle, thus increasing satisfaction of a person who uses the shared vehicle.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure are not limited by the embodiments. The scope of the present disclosure should be construed on the basis of the accompanying claims, and all the technical ideas within the scope equivalent to the claims should be included in the scope of the present disclosure.

What is claimed is:

1. A personalized driving mode control device, comprising:
    a controller configured to determine a driver based on identification information of the driver;
    a memory configured to store driving style information for the driver; and
    a personalized driving mode controller configured to control a drive mode for the driver depending on the driving style information for the driver, the drive mode configured to be controlled by receiving the driving style information of the driver from an external device when the driving style information is not stored in the memory,
    wherein the personalized driving mode controller is configured to correct the driving style information depending on a change in vehicle class and control the drive mode based on the corrected driving style information, when controlling the drive mode by receiving the driving style information of the driver from the external device.

2. The personalized driving mode control device of claim 1, wherein the personalized driving mode controller is configured to correct the driving style information depending on a difference between a vehicle class of a host vehicle of the driver and a vehicle class of a second vehicle in which the driver rides and control the drive mode based on the corrected driving style information when the driver rides in the second vehicle.

3. The personalized driving mode control device of claim 2, wherein:
    the personalized driving mode controller is configured to classify the vehicle class in an order of an economical vehicle, a family vehicle, a sports utility vehicle (SUV), a premium vehicle, and a sporty vehicle; and
    the personalized driving mode controller is configured to determine a correction coefficient by applying the difference between the vehicle class of the host vehicle and the vehicle class of the second vehicle and correct a sporty index of the driving style information using the correction coefficient.

4. The personalized driving mode control device of claim 3, wherein the personalized driving mode controller is configured to multiply a sporty index of the driver, obtained when the host vehicle is traveling, by the correction coefficient according to the difference between the vehicle class of the host vehicle and the vehicle class of the second vehicle to calculate an initial sporty index of the second vehicle.

5. The personalized driving mode control device of claim 3, wherein:
the personalized driving mode controller is configured to calculate an initial sporty index (SI) of the second vehicle using an equation:

Initial SI of another vehicle=final SI of host vehicle*$k$ where SI is the sporty index and k is the correction coefficient; and
the personalized driving mode controller is configured to set the correction coefficient to 1 when the host vehicle and the second vehicle are in a same vehicle class, set the correction coefficient to a value greater than 1 when the second vehicle is more sporty in vehicle class than the host vehicle, and set the correction coefficient to a value less than 1 when the second vehicle is less sporty in vehicle class than the host vehicle.

6. The personalized driving mode control device of claim 3, wherein the personalized driving mode controller is configured to classify the vehicle class into at least one stage and indicate a degree to which a sporty characteristic differs per stage as a relative distance.

7. The personalized driving mode control device of claim 3, wherein the personalized driving mode controller is configured to correct the sporty index by adding a value calculated according to the vehicle class when the host vehicle is more sporty than the second vehicle with respect to the correction coefficient of 1 and subtracting a value calculated according to the vehicle class when the host vehicle is less sporty than the second vehicle with respect to the correction coefficient of 1.

8. The personalized driving mode control device of claim 2, wherein the personalized driving mode controller is configured to receive driving style information of a driver ID from an external server or a user terminal of the driver and control the drive mode based on the received driving style information when the second vehicle is a shared vehicle.

9. The personalized driving mode control device of claim 1, wherein the controller is configured to identify the driver using authentication results of at least one of starting authentication using fingerprint information of the driver, starting authentication using face information of the driver, or starting authentication through near field communication (NFC).

10. The personalized driving mode control device of claim 1, further comprising:
a driver style calculation device configured to calculate the driving style information by applying at least one of an amount of manipulation of an accelerator pedal, a manipulation speed of the accelerator pedal, an amount of manipulation of a steering wheel, or a gradient of a road to a learning algorithm.

11. The personalized driving mode control device of claim 1, further comprising:
a communication device configured to transmit and receive the driving style information with the external device.

12. The personalized driving mode control device of claim 11, wherein the personalized driving mode controller is configured to calculate and update the driving style information per a predetermined time while a vehicle is traveling, store final driving style information in the memory when an ignition is turned off, and transmit the final driving style information to the external device via the communication device.

13. The personalized driving mode control device of claim 1, wherein the personalized driving mode controller is configured to determine the driver as an unregistered driver, when driving style information of the determined driver is not stored in the memory or the external device, execute a learning algorithm during a predetermined time to obtain driving style information, and control a drive mode suitable for the obtained driving style information.

14. A vehicle system, comprising:
an external device configured to transmit, receive and store driving style information for a driver, and
a personalized driving mode control device configured to control a drive mode for the driver depending on the driving style information for the driver, the driving style information being stored in a memory or in an external device, wherein the personalized driving mode control device is configured to control the drive mode by receiving the driving style information of the driver from the external device when the driving style information is not stored in the memory,
wherein the personalized driving mode control device is configured to correct the driving style information depending on a change in vehicle class and control the drive mode based on the corrected driving style information when controlling the drive mode by receiving the driving style information of the driver from the external device.

15. The vehicle system of claim 14, wherein the external device includes a server or a user terminal.

16. The vehicle system of claim 14, further comprising:
a driver authentication starting device configured to perform at least one of starting authentication using fingerprint information of the driver, starting authentication using face information of the driver, or starting authentication through NFC and provide the authenticated result to the personalized driving mode control device.

17. A personalized driving mode control method, comprising:
determining whether driving style information corresponding to driver identification information of a driver is stored in a vehicle, based on the driver identification information; and
controlling a drive mode for the driver based on the driving style information stored in the vehicle or based on driving style information received from an external device when the driving style information is not stored in the vehicle, wherein controlling the driving mode includes:
correcting the driving style information depending on a change in vehicle class; and
controlling the drive mode based on the corrected driving style information, when controlling the drive mode by receiving the driving style information of the driver from the external device.

18. The personalized driving mode control method of claim 17, wherein controlling the drive mode includes:
correcting the driving style information depending on a difference between a vehicle class of a host vehicle of the driver and a vehicle class of a second vehicle in which the driver rides; and
controlling the drive mode based on the corrected driving style information depending on the difference, when the driver rides in the second vehicle.

19. The personalized driving mode control method of claim 18, wherein correcting the driving style information depending on the difference and controlling the drive mode includes:
- classifying the vehicle class in an order of an economical vehicle, a family vehicle, an SUV, a premium vehicle, and a sporty vehicle;
- determining a correction coefficient by applying the difference between the vehicle class of the host vehicle and the vehicle class of the second vehicle; and
- correcting a sporty index of the driving style information using the correction coefficient.

20. The personalized driving mode control method of claim 19, wherein correcting the driving style information depending on the difference and controlling the drive mode includes:
- calculating an initial sporty index (SI) of the second vehicle using an equation:

$$\text{Initial SI of another vehicle} = \text{final SI of host vehicle} * k$$

where SI is the sporty index and k is the correction coefficient; and
- setting the correction coefficient to 1 when the host vehicle and the second vehicle are in a same vehicle class, setting the correction coefficient to a value greater than 1 when the second vehicle is more sporty in vehicle class than the host vehicle, and setting the correction coefficient to a value less than 1 when the second vehicle is less sporty in vehicle class than the host vehicle.

* * * * *

UNITED STATES PATENT AND TRADEMARK OFFICE
CERTIFICATE OF CORRECTION

| | |
|---|---|
| PATENT NO. | : 11,433,907 B2 |
| APPLICATION NO. | : 16/862709 |
| DATED | : September 6, 2022 |
| INVENTOR(S) | : Jeon et al. |

It is certified that error appears in the above-identified patent and that said Letters Patent is hereby corrected as shown below:

On the Title Page

Item (73), Line 2, Assignee; delete "Kia Motor Corporation" and insert --Kia Motors Corporation--.

Signed and Sealed this
Eighteenth Day of October, 2022

Katherine Kelly Vidal
*Director of the United States Patent and Trademark Office*